United States Patent Office 3,440,278
Patented Apr. 22, 1969

3,440,278
PREPARATION OF L-α-METHYLDOPA
Rolf Kallischnigg, Liestal, Switzerland, and Ernst Biekert, Limburgerhof, Germany, assignors to Knoll A.-G., Ludwigshafen (Rhine), Germany
No Drawing. Filed Oct. 6, 1965, Ser. No. 493,558
Claims priority, application Germany, Oct. 9, 1964, K 54,211
Int. Cl. C07c 99/04
U.S. Cl. 260—519         11 Claims

ABSTRACT OF THE DISCLOSURE

L-α-methyldopa is prepared by reacting 2-phenyl-4-methyl-5-oxazolinone in the form of a metal salt or in the presence of a basic condensing agent for forming such a salt with a reactive ester of veratryl alcohol, preferably veratryl chloride, hydrolizing the resulting 2-phenyl-4-veratryl-4-methyl-5-oxazolinone without isolating it partially to N-benzoyl-α-methyl-β-(3,4-dimethoxyphenyl) alanine, resolving the resulting racemate of this compound by means of a diastereomeric salt with an optically active base into the antimers or optical antipodes thereof, and converting the L-antimer into L-α-methyl-β-(3,4-dihydroxyphenyl) alanine by hydrolysis.

---

This invention relates to a method for preparing L-α-methyl-β-(3,4-dihydroxy-phenyl) alanine, also known as L-α-methyldopa, a valuable therapeutic agent for the treatment of hypertension or high blood pressure. This compound is known to be effective through the mechanism of restricting the activity of amino acid decarboxylase.

Two methods of synthesizing α-methyldopa have hitherto been available which utilize, as starting material, phenylacetones of the formula

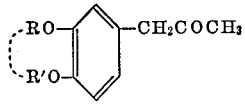

in which R and R' are lower alkyl or form a methylene dioxide ring. Such phenyl acetones are prepared, for example, according to G. A. Stein, H. A. Bronner and K. Pfister, J. Amer. Chem. Soc., volume 77 (1955), pages 700–703, by converting veratryl chloride to the corresponding cyanide, acetylating the cyanide, and then removing the cyanide group, thus:

(1)
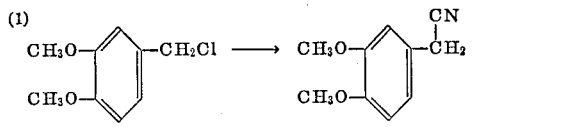

(2)

(3)
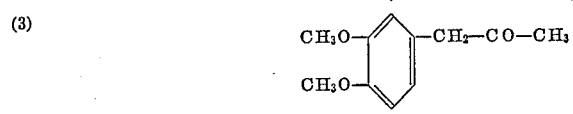

According to the more practicable of the two methods, a phenylacetone of said formula is reacted with a cyanide and an ammonium carbonate to form a hydantoin correspondingly substituted in the 4-position, which is then converted into an alanine derivative by ring cleavage.

It has also been suggested to convert a phenylacetone of said formula to the corresponding aminonitrile with a cyanide and ammonia and to form the corresponding alanine derivative therefrom by hydrolysis.

It has also been suggested to react an aldehyde or ketone with a 5-oxazolinone that is unsubstituted in the 4-position, whereby an unsaturated azlactone is formed. The direct $C_4$-alkylation of a saturated azlactone or of a 4-monoalkylated 5-oxazolinone is not, however, believed to have been suggested heretofore.

It has now been found that high yields of L-α-methyldopa are obtainable much more simply by reacting 2-phenyl-4-methyl-5-oxazolinone in the form of a metal salt or in the presence of a basic condensing agent for forming such an ester with a reactive ester of veratryl alcohol, preferably veratryl chloride, hydrolizing the resulting 2-phenyl-4-veratryl-4-methyl-5-oxazolinone without isolating it partially to N-benzoyl-α-methyl-β-(3,4-dimethoxyphenyl) alanine, resolving the resulting racemate of this compound by means of a diastereomeric salt with an optically active base into the antimers or optical antipodes thereof, and converting the L-antimer into L-α-methyl-β-(3,4-dihydroxyphenyl) alanine by hydrolysis.

One preferred embodiment of the method of this invention is illustrated as follows:

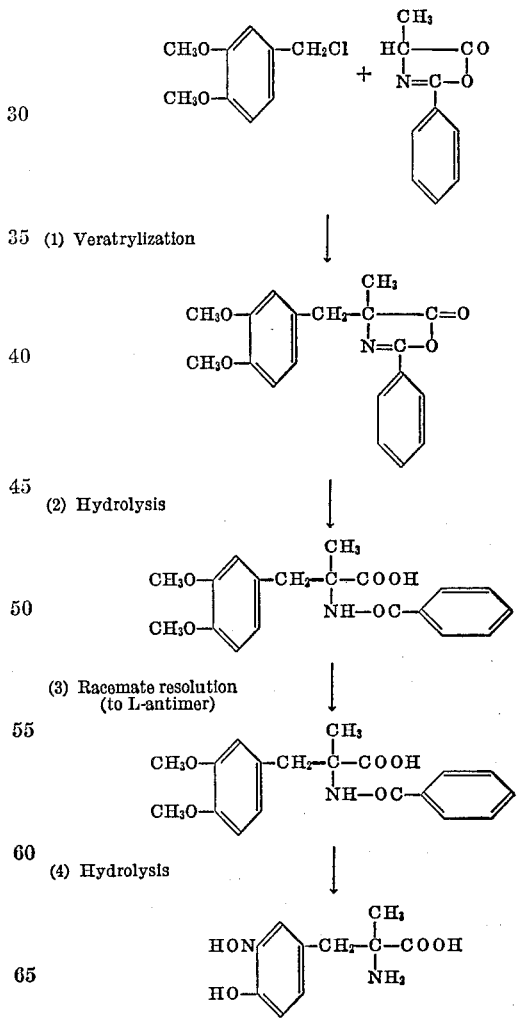

It will be apparent that one important advantage of the method of the invention is that the preparation of dimethoxyphenyl acetone is completely avoided and that it is unnecessary to block either phenolic hydroxyl groups or a primary amino group by acylation and later to split such acyl groups off by hydrolysis. Another advantage is that the starting materials are readily available industrial compounds. This is as true of veratryl chloride as of 2-phenyl-4-methyl-5-oxazolinone, which is easily obtainable in quantitative yield as the azlactone of the well-known N-benzoyl alanine by cyclization thereof with acetic anhydride as described by E. Mohr in the Journal für praktische Chemie, Barth, (2) vol. 81, p. 478 (1910), or by reaction (dehydration) with carbodiimides, as described by J. Z. Siemion in Roczniki Chemii, volume 34, pp. 1479–1482 (1960).

It is particularly advantageous that crude 2-phenyl-4-methyl-5-oxazolinone can be used directly in the synthesis because the traces of acetic anhydride which remain in the residue after distillation of excess acetic anhydride and acetic acid derived therefrom do not deleteriously affect the reaction. It has even been determined that the conversion of pure, crystalline 2-phenyl-4-methyl-5-oxazolinone into the corresponding metal salts takes place more sluggishly and with greater difficulty than the conversion of the crude azlactone. This leads to the conclusion that the crystalline form is predominantly in the less reatcive tautomeric forms:

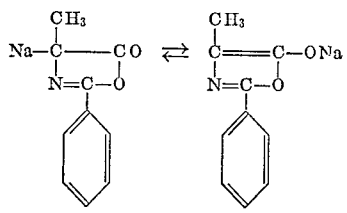

2-phenyl-4-methyl-5-oxazolinone is preferably utilized in the form of a metal salt obtainable readily by reaction with an organo-metallic compound, e.g., an alkali metal alkylate, phenate or naphthylate such as sodium naphthylate, lithium butylate, lithium phenate and Grignard reagents such as ethyl magnesium halides and phenyl magnesium halides. Metal hydrides, especially alkali metal hydrides, such as lithium, sodium and potassium hydrides are also suitable for the preparation of metal salt-forming basic condensing agents such as alkali-metal carbonates, e.g., sodium carbonate and potassium carbonate.

Esters of veratryl alcohol that are suitable in the method of the invention are, by way of example, esters thereof with hydrohalic acids and arylsulfonic acids. Particularly good results are achieved with veratryl chloride.

The conversion is carried out in the presence of anhydrous, inert solvents and/or diluents and at temperatures not exceeding about 100° C. to avoid opening or polymeriaztion of the azlactone ring. Aliphatic or aromatic hydrocarbons, e.g., toluene and xylene, and such solvents as dimethylformamide, dimethylsulfoxide, high molecular weight ethers or acetals are desirably used. The optimum solvent is tetrahydrofuran. Dioxane and glycol diethers, such as diethylene glycol, and acetals are also excellent.

Inasmuch as it is known that benzyl halides in inert solvents are not attacked by alkali hydrides, and since there is a possibility of forming by-products from the sodium salt of 2-phenyl-4-methyl-5-oxazolinone with prolonged heating, it is also possible to react the two reaction components in suitable inert solvents with alkali hydrides so that the metal compounds of the azlactone are formed in the presence of veratryl chloride. This manner of operation is particularly simple and regularly provides good yields.

Without necessarily being isolated, the resulting 2-phenyl-4-veratryl-4-methyl-5-oxazolinone is partially hydrolyzed with water or with a weak alkali or acid to bring about cleavage of the azlactone ring. By using aqueous sodium bicarbonate solution, for example, the sodium salt of N-benzoyl-α-methyl-β-(3,4-dimethoxyphenyl)alanine is obtainable in practically quantitative yields. The resolution of the racemic alanine into the antimers takes place very simply because of the significant differences between the crystal structure, solubility and melting point (192–193° C.) of the racemate from the corresponding properties of the optically active forms, which have a melting point of 146–147° C. Separation of the antimers is effected by seeding a solution thereof with the desired antimer in a suitable solvent such as methanol, acetone or the like containing an optically active base such as quinine, quinidine, brucine, strychnine, cinchonidine, ephedrine, α-phenylethylamine, codeine of menthylamine. The D- and L-antimer salts thus obtained have different solubilities, thus facilitating their separation, and isolation of the antimers of the amino acids is obtainable by treatment with acid.

The hydrolysis of the L-N-benzoyl-α-methyl-β-(3,4-dimethoxyphenyl) alanine to L-α-methyl-β-(3,4-dihydroxyphenyl) alanine takes place with ether cleavage and removal of the benzoyl group by known methods, e.g., by the action of a hydrohalic acid, preferably hydrobromic acid or hydriodic acid in a concentration of between about 30 and 60%, preferably of the order of about 48%. The D-antimer can be hydrolyzed similarly.

By submitting racemic N-benzoyl-α-methyl-β-(3,4-dimethoxyphenyl) alanine to ether cleavage and removal of the benzoyl group, D-L-α-methyl-β-(3,4-dihydroxyphenyl) alanine is obtained which is scarcely distinguishable from the optically active compounds as to melting point and solubility. In contrast to the method of the invention, an attempt to resolve the racemate after acylation would be extremely time consuming.

The advantages and preferred embodiments of the method of the invention will become further apparent from the following examples illustrating the best modes of procedure.

EXAMPLE I.—PREPARATION OF DL-N-BENZOYL-α-METHYL - β - (3,4-DIMETHOXY-PHENYL) ALANINE (A) 32.2 grams of a 50% sodium hydride-oil dispersion are suspended in 250 ml. tetrahydrofuran, the mixture is warmed to 50° C. on a water bath, and an acetic anhydride-containing solution of the crude azlactone in tetrahydrofuran, obtained from 100 g. N-benzoyl alanine as described by E. Mohr, Journal für praktische Chemie, vol. (2) 81, page 478 (1910), is added dropwise in the course of one hour. As soon as the development of hydrogen begins to subside, it is possible to reduce the temperature of the bath to 40° C. After termination of the addition, the mixture is stirred at 50° C. for about thirty minutes, until hydrogen development ceases. 12.5 to 13 liters of hydrogen are obtained.

The resulting brown solution is cooled to 10° C. and 106 g. of veratrylchloride are added. This goes into solution immediately. Upon further stirring, the temperature increases spontaneously to above room temperature, cooling being applied if necessary to maintain a temperature between 25 and 30° C. When exothermic reaction subsides, the reaction mixture is heated for one hour to 30° C., for one hour to 40° C. and for another to 50° C., and finally for two hours to the boil under reflux. The brown color disappears completely.

The excess sodium hydride is destroyed by dropwise addition to the cooled reaction mixture of 30 ml. tetrahydrofuran with a water content of 10%. Toward the end of the reaction the tetrahydrofuran is distilled off under a weak vacuum and the remaining residue is stirred with water while at the same time being acidified to a pH of 2 with 10% hydrochloridic acid. The organic components are adsorbed in dichloromethane and then washed, first with water acidified to pH 2 and then with pure water. After drying with magnesium sulfate and filtrating through activated charcoal, the dichloromethane is distilled off.

To hydrolyze the veratryl-azlactone and separate the non-acid reaction products, the residue is heated on a water bath, for three hours with vigorous stirring, with 600 ml. of a 10% sodium bicarbonate solution, whereby the greater portion of the reaction mass goes into solution. This is then cooled, the aqueous solution is decanted off the undissolved material, and said solution is then shaken twice, each time with 50 ml. dichloromethane. After filtration of the aqueous, alkaline solution through activated charcoal, it is acidified to a pH of 2 with 10% hydrochloric acid. The semi-crystalline product thereby precipitated is crude DL-N-benzoyl-α-methyl-β-(3,4-dimethoxyphenyl) alanine.

The acid, aqueous filtrate is extracted twice, each time with 150 ml. dichloromethane. The precipitated material is then cooked up with this dichloromethane, whereby it largely crystallizes into white crystals. After allowing it to stand for some time at 0° C., the crystallizate is filtered off. The dry weight is 106 grams, the melting point is 187–190° C. An additional 25 g. are obtained by distilling off the dichloromethane phase and repeating the sodium bicarbonate precipitation, it being advantageous to dissolve the second crude product by cooking up with 10% ethyl acetate-containing ether and crystallization therefrom at −20° C.

The two crude crystallizates (131 g.–77% theoretical amount) are recrystallized with ethanol, the solution to be filtered through activated charcoal being concentrated to one-fourth the original volume because of the minimal solubility differential in hot and cold ethanol. 122 g. (69% theoretical amount) of what crystals having a melting point of 192–193° C. are obtained.

(B) Crude 2-phenyl-4-methyl-5-oxazolinone obtained from 100 g. DL-N-benzoylalanine by the method of Mohr and 106 g. veratrylchloride are dissolved in 400 ml. tetrahydrofuran and heated to 50° C.

32.2 g. of a 50% sodium hydride-oil dispersion, or 15 g. oil-free sodium hydride-oil suspended in 100 ml. tetrahydrofuran are adde dropwise to this solution. The spontaneously evolved hydrogen is collected and measured. The initially increasing exothermic heat is absorbed by cooling. As soon as the rate of evolution of hydrogen diminishes, the rate of addition of the sodium hydride suspension at 60° C. is increased. A half hour after the addition is completed, the evolution of gas ceases at about 130 hydrogen. The reaction mixture is then heated to a boil under reflux for another three hours.

The working up and isolation of the resulting DL-N-benzoyl-α-methyl-β-(3,4-dimethoxyphenyl) alanine is then accomplished as described in Example 1A. The yield is 128 g. (72% theoretical); the melting point is 192–193° C.

(C) 107 g. N,N'-dicyclohexylcarbo-diimide and 100 g. DL-N-benzoylalanine are reacted in 500 ml. tetrahydrofuran at 20° C. as described by J. Z. Siemion, referred to earlier. With moderate heating, N,N'-dicyclohexylurea precipitates and a thick paste forms. After standing 16 hours at room temperature, the paste material is heated to 50° C. for 15 minutes and then stirred for another two hours at 30° C.

Into the resulting mixture of azlactone and urea derivative, 30 g. of a 50% sodium hydride-oil dispersion is introduced at 15° C. in the course of an hour in such increments that the evolution of hydrogen remains under control. The released hydrogen is collected and measured. After the initially strong reaction subsides, the temperature is increased from 15 to 50° C. so that a lively evolution of gas continues to take place. The evolution of hydrogen ceases thirty minutes after the addition of sodium hydride is complete. 12.5 to 13 l. (the stoichiometric amount) of hydrogen are obtained. The reaction mixture has the brown coloring of the azlactone-sodium compound.

Thereupon, the reaction mixture is cooled to 10° C. and 106 g. veratryl chloride are added. The reaction and the working up of the reaction product proceeds as described in Example 1(A).

N,N'-dicyclohexylurea is practically insoluble in dichloromethane and can, therefore, easily be separated by filtration from the 2-phenyl-4-veratryl-4-methyl-5-oxazolinone formed in said medium.

117 g. (66% theoretical yield) of pure DL-N-benzoyl-α-methyl-β-(3,4-dimethoxyphenyl) alanine are obtained.

(D) 2-phenyl-4-methyl-5-oxazoline is prepared by reaction of 100 g. DL-N-benzoyl-alanine with 107 g. N,N'-dicyclohexyl carbodiimide in tetrahydrofuran as described in Example 1(C). The precipitated N,N'-dicyclohexylurea is filtered off and washed with tetrahydrofuran. The yield of urea derivative is 114 g. (98% of theoretical).

The filtered azlactone solution is added drop-wise in the course of 15 to 20 minutes to a suspension of 8.8 g. finely powdered 98% lithium hydride (a molar ratio of 1:2.1) in 100 ml. tetrahydrofuran. Evolution of hydrogen begins exothermally. After the exothermic reaction subsides, the reaction mixture is heated to boiling temperature until evolution of hydrogen ceases. 12 l. of gas are collected.

The veratrylation of the lithium compound of the azlactone proceeds sluggishly. After adding 106 g. veratryl chloride to the cooled solution, the reaction mixture is slowly heated in the course of two hours from 20° C. to 65° C. and thereupon heated to a boil for four more hours. The working up and isolation of pure DL-N-benzoyl-α-methyl-β-(3,4-dimethoxyphenyl) alanine is carried out as described in Example 1(A). 115 g. (65% of theoretical) of the pure product, having a melting point at 192–193° C., are obtained.

(E) 8.8 grams of finely pulverized lithium hydride are suspended in 100 ml. tetrahydrofuran. In the course of 15 to 20 minutes and at room temperature, a solution of 90.7 g. pure crystalline 2-phenyl-4-methyl-5-oxazolinone (melting point 39–40° C.) in 100 ml. tetrahydrofuran are added dropwise. An exothermic reaction takes place with evolution of approximately 1 l. hydrogen and a yellow product, probably a lithium hydride complex of the azlactone, separates out. After dilution with 300 ml. tetrahydrofuran, the mixture is heated to a boil under reflux for 6 to 8 hours until the calculated amount of hydrogen has been evolved.

106 g. vertaryl chloride are added to the cooled reaction solution and the resulting extract is heated slowly in the course of two hours to a boil under reflux, whereupon the boiling temperature is maintained for approximately five additional hours.

The working up and isolation of the reaction product proceeds as described in Example 1(A). 88 g. (50% of theoretical) of DL-N-benzoyl-α-methyl-β-(3,4-dimethoxyphenyl) alanine, having a melting point at 192–193° C. are obtained.

(F) A sodium naphthylate solution is prepared under nitrogen in accordance with the procedure described by L. Horner, Annalen vol. 652, page 99 (1962) with 8 grams naphthalene and 14.3 grams sodium in 500 ml. tetrahydrofuran. A solution of 90.7 g. 2-phenyl-4-methyl-5-oxazolone or of the corresponding amount of crude azlactone in 100 ml. tetrahydrfuran is slowly added dropwise at −20° C., to the resulting dark green solution. After the addition has been completed, it is stirred until the solution has reached room temperature. The green coloring quickly assumes a brown tone that is characteristic for the sodium compound of the azlactone. After addition of 106 g. of vertaryl chloride at 10° C., self-heating sets in. The veratrylation is carried out and completed in the manner described in Example 1(A). The naphthalene thus formed again is separated, during the working up of the mass, with the residue that is insoluble in sodium bicarbonate solution.

Upon isolation of the reaction product in accordance with the procedure in Example 1(A), 122 g. (69% of theoretical) DL-N-benzoyl-α-methyl-β-(3,4-dimethoxyphenyl) alanine, having a melting point at 192–193° C., are obtained.

(G) An ether solution of ethyl magnesium bromide, prepared from 14.5 g. magnesium cuttings and 62 g. ethyl-bromide in ether, is added dropwise at −20° C. in the course of three hours to an ether solution of 90.7 g. 2-phenyl-4-methyl-5-oxazolinone. The bromo-magnesium compound of the azlactone thus prepared is precipitated as a finely crystalline precipitate. After heating for one hour to a boil, 106 g. veratryl chloride and 600 ml. dioxane are added. Thereupon the evolved ether is distilled off until a temperature of 70° C. is reached, whereupon stirring is continued for an additional six hours at that temperature.

After complete distillation of the solvent, the procedure of Example 1(A) is carried out. 55 g. (31% of theoretical) DL - N-benzoyl-α-methyl-β-(3,4-dimethoxyphenyl) alanine, having a melting point at 192–193° C., are obtained.

(H) 90.7 g. of 2-phenyl-4-methyl-5-oxazolinone and 106 g. veratryl chloride are dissolved in 400 ml. dimethyl foramide and are stirred at 80° C. upon addition of 143 g. freshly calcined and finely pulverized potassium carbonate until no further evolution of carbon dioxide can be observed.

The dimethyl formamide is then completely distilled off under vacuum and the residue is worked up as described in Example 1(A). 67 g. (38% of theoretical) of the racemic amino acid, having a melting point of 192–193° C., are obtained.

(I) A solution of 181.4 g. of 2-phenyl-4-methyl-5-oxazolinone (the crude product obtained from 200 g. N-benzoyl-alanine as disclosed by E. Mohr) and 193 g. veratryl chloride in 400 cc. tetrahydrofuran is added dropwise in the course of 75 to 80 minutes to a suspension of 54.8 g. of a 50% sodium hydride oil dispersion in 150 cc. tetrahydrofuran heated to a temperature of 50° C. A lively evolution is maintained by adding the first third of the azlactone-vertaryl chloride solution at 50 to 54° C. and then reducing the internal temperature to about 40° C. by slight cooling. Thereupon the reaction mixture is slowly heated and maintained at the boil for three hours.

After the evolution of hydrogen has ceased, the reaction mixture is cooled and excess sodium hydride is destroyed by dropwise addition of 30 cc. tetrahydrofuran containing 10% water. The tetrahydrofuran is then distilled off under vacuum and the residue is heated on the water bath for three hours while vigorously stirring with 1100 cc. of a 10% sodium bicarbonate solution to hydrolyze the azlactone. The N-benzoyl-α-methyl-β-(3,4-dimethoxyphenyl) alanine thereby dissolves as a sodium salt, whereupon the non-acid by-products and the oil are separated. After cooling, the alkaline solution is decanted, insoluble portions are again treated with sodium bicarbonate solution and the aqueous solutions are extracted three or four times, each time with 60 cc. dichloroethane.

After filtration through charcoal, the aqueous alkaline solution is treated with 500 cc. 1,2-dichloroethane warmed to 50 to 60° C. and acidified to pH 2 by dropwise addition of about 500 cc. of 12% hydrochloric acid while stirring vigorously. Upon reaching a pH of 3.5, N-benzoyl-α-methyl-β-(3,4-dimethoxyphenyl)alanine begins to precipitate in the form of fine crystals. The mixture is allowed to stand for 12 hours at 0° C. The crystals are then filtered off, washed with water, cold dichloroethane and finally with ether, and dried. The yield is 217.5 g. crude N-benzoyl-α-methyl-β-(3,4-dimethoxyphenyl)alanine having a melting point of 189–192° C.

The dichloroethane solution is separated from the aqueous phase and the latter is subjected twice to extraction with 50 cc. dichloroethane. The dichloroethane fractions are combined to form an aqueous alkaline solution of the alanine in 1,000 cc. of 6% aqueous sodium bicarbonate. This is shaken with ether, cleared by filtration through charcoal, stirred with 200 cc. dichloroethane and acidified to pH 2 by dropwise addition of 12% aqueous hydrochloric acid. The dichloroethane layer is separated, dried with magnesium sulfate and filtered through charcoal. After completely distilling off the 1,2-dichloroethane, 60 g. of a residue remains which is dissolved in 50 cc. ethyl acetate, diluted with 150 cc. ether and brought to crystallization by allowing it to stand for some time. The crystallized product is filtered off, washed with addition of 10% ethyl acetate and boiled out with a mixture of 40 cc. ether and 40 cc. ethyl acetate. After cooling for some time at 0° C., 27 g. N-benzoyl-α-methyl-β-(3,4-dimethoxyphenyl)-alanine having a melting point of 187–189° C. are filtered off.

The total yield is 244.5 g. corresponding to a 69% theoretical yield.

(J) 21 g. of a finely powdered potassium hydride are suspended in 200 cc. abs. tetrahydrofuran and heated to 30° C. To this, a solution of 90.7 g. of 2-phenyl-4-methyl-5-oxazolinone in 100 cc. abs. tetrahydrofuran are added dropwise in the course of one hour. An evolution of hydrogen begins immediately upon mild heating and is completed to the calculated amount at a reaction temperature of 60° C.

The reaction solution is then cooled to room temperature and reacted with 98 g. veratryl chloride. The reaction begins exothermally and is concluded after a two hour boiling under reflux.

The unused potassium hydride is destroyed by dropwise addition of aqueous tetrahydrofuran into the cold solution. The tetrahydrofuran is then completely distilled off, towards the end under vacuum, and the remaining residue is heated on a water bath for three hours with 540 cc. of a 5% caustic soda solution while stitrring to hydrolyze the azlactone, whereby the N-benzoyl-α-methyl-β-(3,4-dimethoxyphenyl)alanine goes into solution as the sodium salt, whereas the non-acid by-products remain undissolved.

The further purification and isolation of the desired product is effected in the manner described in part (I) of this example.

A total of 119 g. (67% theoretical yield) of pure DL-N-benzoyl-α-methyl-β-(3,4-dimethoxyphenyl)alanine having a melting point at 192–193° C. is obtained.

(K) 27.4 g. of a 50% sodium hydride-oil dispersion are suspended in 250 cc. abs. tetrahydrofuran and heated to 50° C. A solution of 90.7 g. 2-phenyl-4-methyl-5-oxazolinone (in the form of the crude product obtained from 100 g. N-benzoyl-alanine as described by E. Mohr) and 167 g. of p-toluene sulfonic acid veratryl ester (prepared by reacting p-toluene sodium sulfonate with veratryl chloride in toluene or by reacting toluene sulfonic acid chloride with veratryl alcohol in ether and sodium hydroxide solution) in 300 cc. abs. tetrahydrofuran is added dropwise while stirring. An evolution of hydrogen takes place, first slowly but then at a lively (between moderate and vigorous) rate. The addition is complete after approximately 30 minutes and, after boiling for a short time, the calculated amount of hydrogen is liberated. Boiling under reflux for an additional five hours is then carried on, whereupon the reaction product becomes very gelatinous.

After destruction of the unused sodium hydride, the tetrahydrofuran is distilled off completely and the remainder is taken up in ethylene chloride. The ethylene chloride solution is shaken while cold with an ample amount of cold water to remove the sodium salt of the p-toluene sulfonic acid, then dried with magnesium sulfate and freed from the solvent by distillation.

The residue is reacted with 86 g. potassium carbonate in 600 cc. of water and heated for three hours on a water bath while stirring. The N-benzoyl-α-methyl-β-(3,4-dimethoxyphenyl)alanine goes into solution as the potassium salt, whereupon the insoluble material is separated. The further purification and isolation of the desired compound is effected in the manner described in part (I) of this example.

The yield is 126 g. (71% theoretical) pure N-benzoyl-α-methyl-β-(3,4-dimethoxyphenyl)alanine having a melting point at 192–193° C.

EXAMPLE II.—RESOLUTION OF THE RACEMATE OF DL-N-BENZOYL-α-METHYL-β-(3,4 - DIMETHOXYPHENYL)ALANINE

(A) Resolution with a brucine salt 100 g. of a racemic mixture of N-benzoyl-α-methyl-β (3,4-dimethoxyphenyl)alanine having a melting point of 192–193° C. and 115 g. anhydrous brucine base are dissolved in 250 ml. of a 35% boiling acetone solution and, after seeding with a crystallized L-brucine salt, the L-antimer is very slowly crystallized by careful cooling. In order to obtain good, pure crystals of the L-form of the diastereomeric salt, the crystal mass is heated several times to 30 to 40° C. After longer cooling at 0° C., the crystals are filtered off, washed with a very cold 35% acetone solution and then washed with ether.

The dried crude crystallizate weighs 103.4 g. (95% of theoretical). After repeated recrystallization with 35% acetone, as described above, and drying under a vacuum at 60° C., 98 g. (90% of theoretical) brucine salt of the L-antimer are obtained as a semihydrate having a melting point of 125–126° C. and an optical rotation, in methanol, of $[\alpha]_D^{20} + 17.3°$.

The brucine salt of the L-antimer also exists in a second, more stable crystals form, which is obtainable by either of the two following methods:

Method 1: 40 g. of anhydrous brucine base and 34.8 g. of the racemic alanine are reacted with 31 cc. acetone and 21 cc. water and heated under reflux and with stirring for one to two hours. An attractive coarse crystallizate forms gradually without intermediate formation of a clear solution. The acetone solution is diluted with 36 cc. water, heated to a boil for 15 minutes and then allowed to stand overnight at 0° C.

The crystallizate is filtered off, washed with a little 35% acetone and then with ether, and then dried under vacuum at 60° C. The yield is 35.9 g. (96% theoretical). The melting point is 174–176° C.

After a single recrystallization from 80% alcohol, a 90% yield of the salt is obtained. It has a melting point of 175–176° C. and an optical rotation, in methanol, of $[\alpha]_D^{20} + 17.2°$.

Method 2: 50 g. of the racemic alanine and 57.5 g. anhydrous brucine base are dissolved in 300 cc. of 80% boiling alcohol and then diluted with 100 cc. water. The brucine salt of the L-antimer precipitates from the warm solution in the form of coarse crystals. After standing for some time at −20° C., the salt is filtered off, washed with cold 60% alcohol and then with ether, and dried at 60° C. under vacuum.

The yield is 47.7 g. (87.6% theoretical) of the brucine salt of L-N-benzoyl-α-methyl-β-(3,4-dimethoxyphenyl) alanine, having a melting point at 175–176° C.

The filtrates contain, in addition to the uncrystallized remainder of the L-antimer salt, the uncrystallized brucine salt of D-N-benzoyl-α-methyl-β-(3,4-dimethoxyphenyl) alanine.

Decomposition of the L-antimer brucine salt.—To isolate the L - N - benzoyl-α-methyl-β-(3,4-dimethoxyphenyl) alanine, 98 g. of the brucine salt-semihydrate thereof is vigorously shaken with 200 ml. of a 5% hydrochloric acid and 200 ml. dichloromethane until two clear layers are produced. The dichloromethane solution is then separated and washed three times with dilute hydrochloric acid and three times with water. After drying with anhydrous magnesium sulfate, the dichloromethane is distilled off and the residue is adsorbed in a 5% sodium bicarbonate solution. The solution is purified by washing with ether and by filtration through activated carbon and then acidified to a pH of 2 with dilute hydrochloric acid. The precipitated product is adsorbed in ether, dried with magnesium sulfate, and separated from the ether by distillation.

By heating the residue to a boil in diisopropyl ether containing 10% by weight ethyl acetate, 42.6 g. (94.5% of theoretical) crystallized L-N-benzoyl-α-methyl-β- (3,4-dimethoxyphenyl) alanine having a melting point of 144–145° C. are obtained. After a single recrystallization from ethyl acetate diisopropyl ether the compound melts at 146–147° C. and has an optical rotation; in methanol, of $[\alpha]_D^{20} - 28.9°$.

The decomposition of the brucine salt can also be accomplished in the following manner:

98 g. L-N-benzoyl-α-methyl-β-(3,4-dimethoxyphenyl) alanine-brucine salt semihydrate are shaken with 500 cc. ether and 330 cc. of a 6% hydrochloric acid until two clear layers are formed. The ether layer is then separated and the aqueous brucine-hydrochloride solution is extracted several times, each time with 500 cc. ether. The ether solutions are combined and shaken three times, each time with 30 cc. of 3% hydrochloric acid and thereafter twice with water and dried with magnesium sulfate. The ether is distilled off completely. After boiling with 50 cc. diisopropyyl ether and 10% ethyl acetate, the semicrystalline reisdue yields 41.8 g. crystalline L-N-benzoyl-α-methyl-β-(3,4-dimethoxyphenyl) alanine having a melting point of 145–146° C. This corresponds to a yield of 99% of theoretical yield based on the recoverable amount of the racemate.

After recrystallization from a mixture of ethyl acetate and diisopropyl ether by solution in boiling ethyl acetate, concentration to a 70 g. solution and dilution with 75 g. hot diisopropyl ether, a compound melting at 146–147° C. is obtained.

Recovery of the racemic alanine from the brucine salt that is not separated.—The brucine salt solutions are freed from acetone by distillation and shaken with 340 cc. of 6% aqueous hydrochloric acid and 500 cc. ether. Whereas the D-antimer of the amino acids goes rapidly into solution, the racemate precipitates out in the form of crystals. The mixture is allowed to stand for some time at 0° C. and then the crystals are filtered off. These contain primarily DL-N-benzoyl-α-methyl-β-(3,4-dimethoxyphenyl) alanine as well as a small proportion of crystalline D-compound for further purification. The crystallizate is heated to a boil under reflux for one hour with a mixture of 100 cc. ether and 100 cc. ethyl acetate. After standing for some time, 15.3 g. of racemic N-benzoyl-α-methyl-β-(3,4-dimethoxyphenyl) alanine having a melting point of 187–189° C. are crystallized out. The substance is used in a subsequent racemate separation step.

Isolation of the D-antimers.—The D-N-benzoyl-α-methyl-β-(3,4-dimethoxyphenyl) alanine dissolved in ether as well as in the ether-ethyl acetate mixture is freed from the solvent by concentration and brought to crystallization by boiling with diisopropyl ether and 10% ethyl acetate. 39.7 g. and then two additional grams of D-N-benzoyl-α-methyl-β-(3,4-dimethoxyphenyl) alanine are obtained in crystalline form. The crystals melt at 144–146° C. and are again recrystallized.

It is also possible to dissolve the brucine salt, separated from the solvent, in 300 ml. dichloromethane and intensively shaking this with 250 ml. of 5% hydrochloric acid until two clear layers are obtained. The dichloromethane solution is separated, washed three times with dilute hydrochloric acid and then with water. The dichloromethane is completely distilled off, the residue is dissolved in 5% sodium bicarbonate solution, shaken with ether and purified over activated charcoal. An amorphous precipitate is obtained from the aqueous alkaline solution by acidification with diluted hydrochloric acid to a pH of 2 and heated to a boil with ether. This causes dissolution of the D-antimer, whereas the racemic N-benzoyl-α-methyl-β - (3,4 - dimethoxyphenyl) alanine crystallizes out. By cooling for several days at −20° C., a quantitative separation of the racemate is obtained, which can be set aside for a further resolution. The amount of racemate thus recovered is 10 g. The ether solution of the D-antimer is freed from ether and the residue is brought to a boil with diisopropyl ether containing 10% ethyl acetate.

After working up the filtrate, 39.5 g. (88% of theoretical) crystalline D-N-benzoyl-α-methyl-β-(3,4-dimethoxyphenyl) alanine, having a melting point of 144–145° C., are obtained.

After once recrystallizing from diisopropyl ether acetic acid ester, as described for the L-antimer, the D-antimeter melts at 146–147° C. and has an optical rotation in methanol of $[\alpha]_D^{20} +28.5°$.

(B) Racemate resolution with quinidine salt

L-form.—100 g. of a racemic N-benzoyl-α-methyl-β-(3,4-dimethoxyphenyl) alanine and 94.5 g. quinidine base are dissolved in 200 ml. boiling methanol and, after seeding with the corresponding diastereomeric salt, the D-antimer is allowed to crystallize by very slow cooling. By frequent, moderate reheating, it is possible to build the strongly felted fibers of the crystalline salt into coarser crystals. After cooling for some time at −20° C., the crystals are filtered off and washed with very cold methanol and then with ether. The salt, which melts at 117–120° C., is dried under vacuum at 50° C., and is the quinidin salt-dimethanolate of D-N-benzoyl-α-methyl-β-(3,4-dimethoxyphenyl) alanine. It is obtained in a yield of 84 grams (79% of theoretical). The salt gives off methanol in a high vacuum at 110° C. The melting point of the methanol salt is 181–182° C. By recrystallizing the dimethanolate with 43% alcohol, the monohydrate of the salt is obtained in the form of felt-like needles having a melting point at 114–115° C. The D-N-benzoyl-α-methyl-β-(3,4-dimethoxyphenyl) alanine-quinidine salt-dimethanolate can be worked up in the same manner as described with reference to the decomposition of the brucine salt of the L-antimer. 37 g. (94% of theoretical based on the yield of quinidine salt) of the D-N-benzoyl-α-methyl-β-(3,4-dimethoxyphenyl) alanine, having a melting point at 146–147° C., are obtained.

The methanol filtrate contains, in addition to the remaining D-antimer salt, the uncrystallized quinidine salt of the L-antimer.

D-form.—For the isolation of the L-antimer, the quinidine salt filtrate is concentrated, the residue is dissolved in 300 ml. dichloromethane, as in the resolution with brucine salt of the D-antimer, with 5% hydrochloric acid and is worked up in an analogous manner. 21 grams of the racemate are obtained in the form of a crystallizate that is difficultly soluble in ether.

The ether-soluble part yields, after distillation of the ether and recrystallization of the residue, 34 g. (86% of theoretical) of the L-antimer, which has a melting point at 146–147° C.

(C) Racemate resolution with quinine salt

The possibility of separating racemic N-benzoyl-α-methyl-β-(3,4-dimethoxyphenyl) alanine with quinine is based on the fact that the quinine salt of the L-antimer can be obtained only from anhydrous solvents whereas the quinine salt of the D-antimer requires water for crystallization.

Method 1: Quinine salt of the L-N-benzoyl-α-methyl-β-(3,4-dimethoxyphenyl) alanine.—100 g. racemic N-benzoyl-α-methyl-β-(3,4-dimethoxyphenyl) alanine and 95 g. anhydrous quinine base are dissolved in 150 cc. ethyl acetate and reacted with 150 cc. hot diisopropyl ether or diethyl ether. The quinine salt of the L-antimer begins to crystallize immediately or after seeding. After allowing it to stand for some time at room temperature, the crystal mass is heated once or twice to obtain purer aggregates. After letting it stand for twelve hours at 0° C., it is filtered off and then washed with a small amount of a cold, 1:1, ethyl acetate-diisopropyl ether mixture.

After drying under vacuum at 60° C., 104 g. crude crystallizate having a melting point at 109–112° C. (minor sintering beginning at 105° C.) are obtained.

This crude product is heated to a boil with a mixture of 150 cc. ethyl acetate and 150 cc. diisopropyl ether and then allowed to stand for twelve hours at −18° C. After filtration, 89.3 g. of the quinine salt having a melting point at 114–116° C. (minor sintering beginning at 109 °C.) are obtained. The melting point remains constant even after three recrystallizations from ethyl acetate. The optical rotation, in methanol, is $[\alpha]_D^{20} -53.4°$. The quinine salt of the L-antimer contains two molecules ethyl acetate per three molecules salt.

Quinine salt of D-N-benzoyl-α-methyl-β-(3,4-dimethoxyphenyl) alanine.—The filtrate obtained after separation of the quinine salt of the L-antimer is reacted at elevated temperature with 5 to 6 cc. water. The quinine salt of the D-N-benzoyl-α-methyl-β-(3,4-dimethoxyphenyl) alanine crystallizes in the form of attractive, coarse crystals containing water of crystallization. After cooling for some time to −20° C., the crystals are filtered off, washed with a 1:1 mixture of ethyl acetate and ether, and dried in a vacuum at 60° C. 83 g. (83% theoretical) of the quinine salt of the D-antimer are obtained as the monohydrate. It has a melting point at 119–121° C. (minor sintering begins at 115° C.).

This crude product can be further purified by recrystallization from 380 cc. ethyl acetate and 10 cc. water without, however, changing the melting point. It has optical rotation, in methanol, $[\alpha]_D^{20} -150.6°$.

14 g. of racemic N-benzoyl-α-methyl-β-(3,4-dimethoxyphenyl) alanine are recovered from the final filtrate after distillation of the solvent, so that the actual yield of the L-antimer quinine salt is increased to 98% theoretical and of the D-antimer quinine salt to 97% theoretical.

Method 2: 100 g. DL-N-benzoyl-α-methyl-β-(3,4-dimethoxyphenyl) alanine and 95 g. anhydrous quinine base are dissolved at elevated temperature in 550 cc. of 40% aqueous acetone and the solution is seeded with the D-antimer quinine salt upon cooling. With slow cooling, finally at 0° C., the quinine salt of the D-antimer crystallizes out as the monohydrate in the form of coarse crystals. It is filtered off, washed with cold 40% aqueous acetone and then dried at 60° C. under vacuum. The yield is 75.4 g. (75.4% theoretical) of a crystal product having a melting point at 119–121° C. (sintering beginning at 115° C.). After this partial separation of the D-antimer quinine salt, the filtrate is fully concentrated, the residue is completely dehydrated with toluene and the toluene is then distilled off. The residue is dissolved in 250 cc. ethyl acetate and reacted slowly, while boiling and stirring with 200 cc. ether or diisopropyl ether, whereupon the quinine salt of L-N-benzoyl-α-methyl-β-(3,4-dimethoxyphenyl) alanine begins to crystallize. After allowing it to stand for some time at 0° C., it is filtered off, washed with a 1:1 mixture of ethyl acetate and ether, or with diisopropyl ether, and dried at 60° C. under vacuum. 99 g. of crude L-antimer quinine salt are obtained. The salt has a melting point of 114–116° C. and begins to sinter at 108° C.

This crude product is purified by heating to a boil with a mixture of 150 cc. ethyl acetate and 150 cc. diethyl- or diisopropyl ether. The yield is 94 g. (89% theoretical) of pure, ethyl acetate-containing L-N-benzoyl-α-methyl-β-(3,4-dimethoxyphenyl) alanine-quinine salt having a melting point of 114–116° C., which begins to sinter at 110° C. and has an optical rotation in methanol of $[\alpha]_D^{20} -53.4°$.

The filtrates from the crystallization and purification are combined and concentrated. Upon addition of 2 cc. water and drying with ether, additional crystalline salt of the D-antimer is obtained as a monohydrate. After recrystallization from an ethyl acetate-water mixture, an additional 22.1 g. quinine salt of the D-antimer are obtained. It has a melting point at 119–121° C., and begins to sinter at 115° C. The total amount of quinine salt of the D-antimer is therefore 97.5 g. (97.5% theoretical).

Decomposition of the diastereomeric quinine salts.—
89.3 g. L-N-benzoyl-α-methyl-β-(3,4-dimethoxyphenyl) alanine-quinine salt are shaken with 400 cc. water, 57 cc. of 12% aqueous hydrochloric acid and with either 500 cc. ether and 50 cc. ethyl acetate or with 350 cc. diisopropyl ether and 150 cc. ethyl acetate until the salt has gone almost completely into solution. After letting it stand for some time at 0° C., the undissolved portion is filtered off. 1.1 g. of the racemate having a melting point at 192–193° C. is thereby recovered.

The aqueous quinine-hydrochloride solution is separated from the filtrate, the ether-ethyl acetate solution is washed, first with 1% aqueous hydrochloric acid and then three times with water, dried with magnesium sulfate and separated from the solvent.

The residue (41 g.) is recrystallized by dissolution in ethyl acetate, filtration, concentration and dilution in diisopropyl ether. The main crystallizate is 38.3 g. (76.6% theoretical) L-N-benzoyl-α-methyl-β-(3,4-dimethoxyphenyl) alanine having a melting point at 146–147° C., and an optical rotation, in methanol, of $[\alpha]_D^{20}$ —29.1°.

An additional 2 g. of L-N-benzoyl-α-methyl-β-(3,4-dimethoxyphenyl) alanine having a melting point at 145–146° C. are also obtainable from the ethyl acetate-diisopropyl ether mixture.

The total yield from the solvent-containing quinine salt with exclusion 1.1 g. recovered racemate is therefore 98% of the theoretical.

Isolation of the D-N-benzoyl-α-methyl-β-(3,4-dimethoxyphenyl) alanine and recovery of the remainder of the racemate is accomplished in the manner described in Example 2, part (A).

(D) Racemate resolution with codeine salt 100 g. racemic N-benzoyl-α-methyl-β-(3,4-dimethoxyphenyl) alanine and 92.5 g. of codeine base monohydrate are dissolved in 300 cc. 15% hot acetone. After seeding and standing for some time at 0° C., 69.5 g. (72% theoretical) of crude L-N-benzoyl-α-methyl-β-(3,4-dimethoxyphenyl) codeine salt monohydrate crystallize. This salt has a melting point at 119–120° C. and begins to sinter at 118° C. It is filtered off and washed with cold water, recrystallized from three times the amount of water plus 10% acetone and, after standing some time at 0° C., yields 62.7 g. (65% theoretical) pure L-N-benzoyl-α-methyl-β-(3,4-dimethoxyphenyl) alanine-codeine salt-monohydrate having a melting point at 120–121° C. It begins to sinter at 119° C. and has an optical rotation in methanol of $[\alpha]_D^{20}$ —14.4° C.

Decomposition of codeine salt.—To isolate the L-N-benzoyl-α-methyl-β-(3,4-dimethoxyphenyl) alanine, 50 g. of said codeine salt is suspended in 100 cc. 5% hydrochloric acid and shaken with 150 cc. ether until two clear solutions are formed. The ether layer is separated off and the water layer is againt extracted with ether. The combined ether solutions are then dried with anhydrous magnesium sulfate. The residue is brought to crystallization by boiling with 80 cc. diisopropyl ether and 10% ethyl acetate. After standing for some time at 0° C. the product is filtered off and washed with a little cold diisopropyl. After drying, a very pure product is obtained without further recrystallization in an amount of 25.5 g. (98% theoretical) which has a melting point of 145–146° C. and an optical rotation in methanol of $[\alpha]_D^{20}$ —28.7°.

EXAMPLE III.—HYDROLYSIS TO L-α-METHYL-β-(3,4 - DIHYDROXYPHENYL) ALANINE (L - α-METHYLDOPA)

(A) 50 g. of L-N-benzoyl-α-methyl-β-(3,4-dihydroxyphenyl) alanine are heated to a boil under reflux and under an atmosphere of carbon dioxide for 4 to 5 hours with 220 ml. of 48% hydrobromic acid. The compound rapidly dissolves. A translucent, weakly violet solution is formed. During the boiling, a part of the separated benzoic acid sublimes in the cooler.

After cooling, the hydrobromic acid solution is diluted with an equal part by weight of water, the separated benzoic acid is extracted with ether, and the solution is concentrated under nitrogen and on a water bath at reduced pressure. To separate the remaining free acid, the residue is redistilled and suction filtered twice with water and then with alcohol and finally with acetone.

The viscous residue is dissolved in 300 ml. acetone and filtered through iron-free activated charcoal. By dropwise addition of 18 ml. diethyl amine to a pH of 8.5, the amino acid and diethylamine hydrobromide are precipitated as a viscous, light brown mass which crystallizes upon extensive and vigorous shaking. The suspension thus obtained is brought to a pH of 6 with 1 to 2 ml. glacial acetic acid. After cooling at 0° C., the crystalline mixture is filtered off and diethylamine-hydrobromide is separated by boiling it from 2 to 3 times, each time with 400 ml. of acetone.

The crude, beige colored amino acid that is obtained in quantitative yield is recrystallized twice in the following manner.

The compound is dissolved in the required amount of water at 70 to 80° C. under an inert gas. Iron-free activated charcoal is added and sulfur dioxide is introduced. The solution is filtered and concentrated on a steam bath under a vacuum and an atmosphere of nitrogen to onefifth of its initial volume. During the filtration, drying and collection that follows, oxygen and light are carefully excluded.

26 g. (85% of theoretical) of a pure white L-α-methyl-β-(3,4-dihydroxyphenyl) alanine, having a melting point (with decomposition) of 300° C., are obtained as a labile hydrate. The sesquihydrate containing 11.35% water and having an optical rotation in water of $[\alpha]_D^{20}$—14.6° is somewhat more stable. This sesquihydrate, however, gradually loses water upon drying under vacuum and becomes practically anhydrous under a high vacuum at about 110° C. over phosphorus pentoxide. The optical rotation $[\alpha]_D^{20}$ of the product is —15.6° in 5.5% water, —15.9° in 3.6% water and —16.5° in 0% water.

The filtrates yield, after renewed treatment with charcoal and sulfur dioxide and concentration, 2 g. of additional material. The combined yield of pure L-α-methyldopa is 28 g., or 91% of theoretical.

When the diethylamine hydrobromide is removed upon separation of the α-methyldopa with diethylamine by boiling with excess amounts of acetone, some L-α-methyl-β-(3,4-dihydroxyphenyl) alanine also goes into solution. This portion crystallizes out at 0° C. in admixture with diethylamine hydrobromide. The crystallizate is filtered off, boiled three times with 50 cc. acetone each and the insoluble portion is recrystallized from water. The yield thus obtained is 1.5 g. crude L-α-methyl-β-(3,4-dihydroxyphenyl) alanine.

(B) 50 g. of L-N-benzoyl-α-methyl-β-(3,4-dimethoxyphenyl) alanine are heated to a boil for five hours under reflux and under a carbon dioxide atmosphere with 220 cc. 48% hydrobromic acid to split off the ether and benzoyl groups. After cooling, the hydrobromic acid solution is diluted with an equal volume of water, the separated benzoic acid is removed by extraction with ether, and the solution is concentrated on the water bath under an inert (nitrogen) gas. To remove the remainder of the acid, the solution is distilled twice with water, both times under vacuum.

The light brown, viscous residue is dissolved in 100 cc. water and treated with activated charcoal upon introduction of sulfur dioxide. After filtration, the light yellow solution is warmed to 50° C. and a solution of 27 g. sodium acetate trihydrate (1.35 mol) in 50 cc. water is added. The L-α-methyl-β-(3,4-dihydroxyphenyl) alanine begins to crystallize out while it is still warm. After being allowed to standing for 12 hours at 0° C., 30.5 g. crude amino acid, which still contains some sodium bromide, is filtered off. The filtrate is again treated with activated charcoal and sulfur dioxide and concentrated to 100 g. solution after filtration. It yields an additional 1.4 g. amino acid upon cooling. Both crystallizates are dissolved in 410 cc. water at 85° C. under an inert gas, treated with activated charcoal and sulfur dioxide, and concentrated to a 115 g. solution under an inert gas after filtration. The yield is 30.7 g. pure L-α-methyl-β-(2,4-dihydroxyphenyl) alanine which decomposes upon melting at 300° C. without previous discoloration. The yield is 99.6% of the theoretical. The compound thus purified is surprisingly stable to oxygen and light.

We claim:
1. Process for preparting L-α-methyldopa which comprises reacting 2-phenyl-4-methyl-5-oxazolinone with an ester prepared from veratryl alcohol and a hydrohalic acid or veratryl alcohol and an arylsulfonic acid in an anhydrous, inert solvent and at a temperature not exceeding about 100° C. to form 2-phenyl-4-veratryl-4-methyl-5-oxazolinone, partially hydrolyzing said oxazolinone to the corresponding N-benzoyl-α-methyl-β-(3,4-dimethoxyphenyl)alanine racemate, resolving said racemate to separate the L-antimer thereof, and hydrolyzing the resulting L-N-benzoyl-α-methyl-β-(3,4-dimethoxyphenyl) alanine to L-α-methyldopa.

2. The process defined in claim 1 wherein the 2-phenyl-4-methyl-5-oxazolinone is reacted with an ester prepared from veratryl alcohol and a hydrohalic acid or veratryl alcohol and an arylsulfonic acid in the presence of an alkali metal hydride.

3. The process defined in claim 1 wherein the 2-phenyl-4-methyl-5-oxazolinone is used in the form of a salt with a member of the group consisting of alkali metal alkylates, phenates and naphthylates.

4. The process defined in claim 1 wherein the 2-phenyl-4-methyl-5-oxazolinone is used in the form of a salt with a Grignard reagent selected from the group consisting of alkyl magnesium halides and aryl magnesium halides.

5. The process defined in claim 1 wherein the 2-phenyl-4-methyl-5-oxazolinone is used in the form of a salt with an alkali metal carbonate.

6. The process defined in claim 1 wherein the 2-phenyl-4-methyl-5-oxazolinone is reacted with veratryl chloride.

7. The process defined in claim 1 wherein the 2-phenyl-4-methyl-5-oxazolinone is reacted with p-toluene sulfonic acid veratryl ester.

8. The process defined in claim 1 wherein the solvent is selected from the group consisting of tetrahydrofuran, dioxane and diethylene glycol.

9. The process defined in claim 1 wherein the L-N-benzoyl-α-methyl-β-(3,4-dimethoxyphenyl) alanine is hydrolyzed to L-α-methyldopa by treatment with a hydrohalic acid.

10. The process defined in claim 1 wherein the solvent is tetrahydrofuran.

11. The process defined in claim 1 wherein the reactive ester is a hydrohalic acid ester of veratryl alcohol or an arylsulfonic acid ester of veratryl alcohol.

References Cited

Organic Chemistry, by Finar, vol. I (1963), p. 677 cited.

LORRAINE A. WEINBERGER, *Primary Examiner.*

A. THAXTON, *Assistant Examiner.*

U.S. Cl. X.R.
260—307